United States Patent [19]

Kida et al.

[11] Patent Number: 4,647,639

[45] Date of Patent: Mar. 3, 1987

[54] MONOMERIC MIXTURE FOR CURED POLYMERIC MATERIAL USED IN ORGANIC GLASS

[75] Inventors: Yasuji Kida, Kudamatsu; Kaoru Miura; Ikumi Kawaguchi, both of Tokuyama, all of Japan

[73] Assignee: Tokuyama Soda Kabushiki Kaisha, Yamaguchi, Japan

[21] Appl. No.: 815,936

[22] Filed: Jan. 3, 1986

Related U.S. Application Data

[62] Division of Ser. No. 670,602, Nov. 13, 1984, Pat. No. 4,602,075.

[30] Foreign Application Priority Data

Nov. 11, 1983 [JP] Japan ................................ 59-211015

[51] Int. Cl.$^4$ ............................................. C08F 218/24
[52] U.S. Cl. ................................................... 526/293
[58] Field of Search ............... 526/287, 293, 313, 314; 351/160 R, 160 H; 522/181

[56] References Cited

U.S. PATENT DOCUMENTS

| | | | |
|---|---|---|---|
| 2,385,932 | 10/1945 | Muskat et al. | 526/293 |
| 2,455,652 | 12/1948 | Bralley et al. | 526/314 |
| 2,548,141 | 4/1951 | Bralley | 526/293 |
| 2,568,658 | 9/1951 | Pope | 526/314 |

*Primary Examiner*—Paul R. Michl
*Attorney, Agent, or Firm*—Sherman & Shalloway

[57] ABSTRACT

A monomeric mixture for a cured polymeric material used as organic glass includes an aromatic di(meth)allyl carbonate (I), an aliphatic di(meth)allyl carbonate (II) and di(meth)allyl carbonate (III) having aromatic and aliphatic moieties. The amount of the di(meth)allyl carbonate of formula (III) is 0.1 to 10 parts by weight per 10 parts by weight of the aliphatic di(meth)allyl carbonate of formula (II). The monomeric mixture retains its uniform state without phase separation during long-term storage and gives a cured polymeric material having excellent transparency.

9 Claims, No Drawings

MONOMERIC MIXTURE FOR CURED POLYMERIC MATERIAL USED IN ORGANIC GLASS

This is a division, of application Ser. No. 670,602, filed Nov. 13, 1984, now U.S. Pat. No. 4,602,075.

This invention relates to a monomeric mixture for a cured polymeric material used in organic glass, and to a cured polymeric material for the monomeric mixture.

Thermoplastic resins of the polymerization type such as acrylic resins and polystyrene resins and thermosetting resins of the condensation type such as urea resins and phenolic resins are well known as colorless clear synthetic resins. Highly crosslinked polymers such as a diethylene glycol bis(allyl carbonate polymer and a polymer of a plurality of carbonate compounds having a polymerizable double bond such as 2,2-bis(4-allyloxycarbonyloxyethoxyphenyl)propane or nuclearly halogen-substituted products thereof are also known as clear synthetic resins.

These transparent synthetic resins are used in applications permitting good view therethrough, for example as boxes or show cases for displaying articles on sale, windowpanes, cover glasses of measuring instruments, protective covers of cathode-ray tubes or other illuminant devices and windshield glasses of automobiles, aircraft and autocycles; applications for wearing on a human body, especially eyes, for example as protective masks or eye glasses for dustproof and explosion-protecting purposes, sunglasses and eye glasses for sight correction; and optical applications, for example as lenses and prisms.

The transparent thermoplastic resins of the polymerization type are unsuitable for applications designed for long-term use because they have insufficient surface hardness and are susceptible to scratch. The thermsetting resins of the condensation type have the defect that an internal stress generated during condensation is difficult to remove, and because of their inherent brittle nature, they are liable to develop cracks and to break.

On the other hand, highly crosslinkedd polymers, especially polymers of carbonate compounds have a relatively high refractive index, and therefore are widely used in optical applications such as lenses for eye glasses. For example, diethylene glycol bis(allyl carbonate) monomer is commercially available and shows excellent polymerizability, and its polymer, because of its excellent transparency, is widely used as lenses for sunglasses or eye glasses for sight correction of school children (see "Encyclopedia of Polymer Science and Technology", volume 1, pages 799–803, 1964, John Wiley & Sons, Inc., and U.S. Pat. No. 4,146,696). A polymer derived from the diethylene glycol bis(allyl carbonate) monomer, however, is not entirely satisfactory as a lens material, especially one for eye glasses because it does not have sufficient surface hardness and shows a refractive index of about 1.50 at the highest.

UK Patent Application No. 2034721 A discloses a copolymer having a refractive index of at least 1.55, and a lens composed of this copolymer, said copolymer comprising as main components at least one first monomer represented by the following general formula

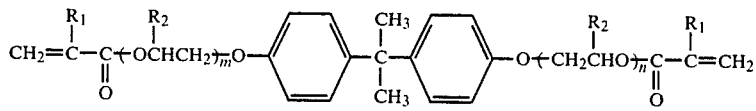

wherein
$R_1$ represents hydrogen or a methyl group,
$R_2$ represents hydrogen or a methyl group, and m and n are integers provided that the sum of m and n is from 0 to 4,
and at least one second radical-polymerizable monomer whose homopolymer has a refractive index of at least 1.55. This patent application describes resins having a refractive index of 1.556 to 1.604.

UK Patent GB 2076836B discloses an organic glass comprising a cured resin consisting substantially of a first polymer unit derived from an unsaturated compound having two terminal vinyl groups represented by the following general formula

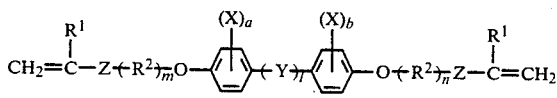

wherein $R^1$ is a hydrogen or methyl, $R^2$ is a group of the formula $-OCH_2CH_2-$,

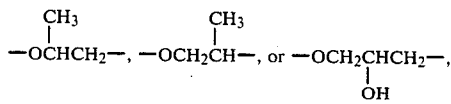

bonded to Z by the bond shown on the left hand side of the formula, Z represents a group of the formula $-CO-$, $-CH_2-$ or $-CH_2OCO-$ bonded to the carbon atom to which $R^1$ is bonded by the bond shown on the left hand side of the formula, X is chlorine or bromine, Y is $-O-$, $-SO_2-$, $-CH_2$, or

l is 0 or 1, m and n, independently from each other, represent an integer of 1 to 4, and a and b, independently from each other, represent an integer of 1 to 4, and a second polymer unit derived from another unsaturated compound radical-polymerizable with the first-mentioned unsaturated compound, said polymer units being bonded to each other at random.

The copolymers described in the UK Patent Application No. 2034721A are not a carbonate but an ester, but are characteristic in that it gives a relatively high refractive index. Many of the copolymers, however, do not show a satisfactorily high refractive index, and seem to have a tendency to coloration in a yellowish shade.

The copolymers described in the above-cited UK Patent GB 2076836B have excellent clarity, but since the monomers for these copolymers have somewhat unsatisfactory polymerizability, the selection of the polymerization conditions is not always easy.

It is an object of this invention to provide a novel monomeric mixture capable of giving a novel cured polymeric material suitable for use as organic glass.

Another object of this invention is to provide a novel monomeric mixture for which it is easy to select cross-linking polymerization conditions that permit a faithful reproduction of the configuration of a mold in the production of a cured polymeric material in a form suitable for use as organic glass.

Still another object of this invention is to provide a stable monomeric mixture which retains its uniform state without phase separation during long-term storage.

Yet another object of this invention is to provide a novel monomeric mixture which gives a cured polymeric material having excellent transparency.

A further object of this invention is to provide a novel monomeric mixture which gives a cured polymeric materal having a high refractive index of, for example, at least 1.52.

An additional object of this invention is to provide a monomeric mixture of a novel composition capable of giving a cured polymeric material which when processed into an optical material such as a lens, has excellent grindability, can be easily surface-treated for provision of a hard coating or an anti-reflecting coating and can also be dyed easily.

Other objects and advantages of this invention will become apparent from the following description.

These objects and advantages of this invention are achieved in accordance with this invention by a monomeric mixture for a cured polymeric material used as organic glass, said mixture at least comprising an aromatic di(meth)allyl carbonate represented by the following formula (I)

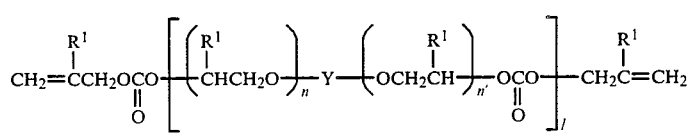

wherein R¹'s are identical or different and each represents a hydrogen atom or a methyl group, Y represents the following groups (a) to (g)

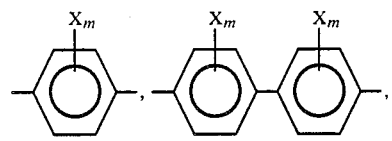

(a)  (b)

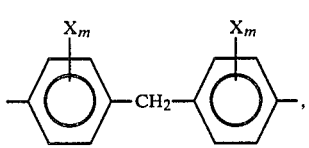

(c)

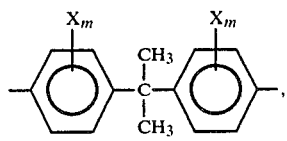

(d)

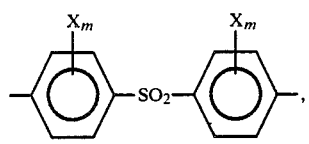

(e)

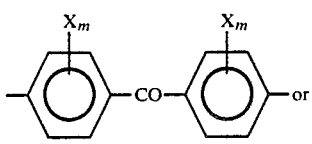

(f)

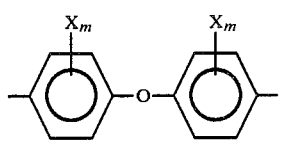

(g)

in which m is a number of 0, 1 or 2 and X's may be identical or different and each represents a halogen atom, n and n' are identical or different and each represents a number of 1 to 12, and l is a number of 1 or 2, an aliphatic di(meth)allyl carbonate represented by the following formula (II)

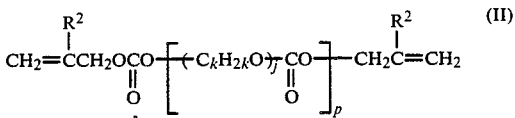

wherein R²'s are identical or different and each represents a hydrogen atom or a methyl group, k is an integer of 2 to 6, j is a number of 1 to 12, and p is a number of 1 or 2, and a di(meth)allyl carbonate represented by the following formula (III)

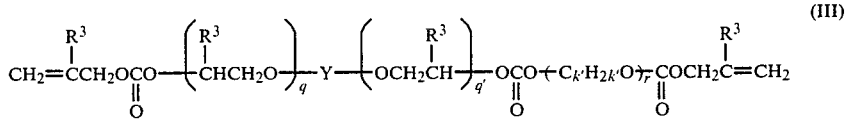

wherein R³'s are identical or different and each represents a hydrogen atom or a methyl group, Y is a group selected from the groups defined for Y in formula (I), k' is a number of 2 to 6, and q, q' and r are identical or different and each represents a number of 1 to 12, the amount of the di(meth)allyl carbonate of formula (III) being 0.1 to 10 parts by weight per 10 parts by weight of the aliphatic di(meth)allyl carbonate of formula (II).

As stated above, the monomeric mixture of the invention contains the aromatic di(meth)allyl carbonate of formula (I), the aliphatic di(meth)allyl carbonate of formula (II) and the di(meth)allyl carbonate of formula (III).

Investigations of the present inventors have shown that the use of the aromatic di(meth)allyl carbonate of formula (I) and the aliphatic di(meth)allyl carbonate of formula (II) is important for giving a cured polymeric material having a high refractive index and a good polymerized state, and that the use of the di(meth)allyl carbonate of formula (III) effectively inhibits the separation of the aromatic di(meth)allyl carbonate of formula (I) as a precipitate in the monomeric mixture without preventing the resulting cured polymeric material from gaining the aforesaid high refractive index and good polymerized state and thus maintains the monomeric mixture in a stable uniform state over a long period of time.

For this purpose, the di(methy)allyl carbonate of formula (III) is included in an amount of 0.1 to 10 parts by weight per 10 parts by weight of the aliphatic di(meth)allyl carbonate of formula (II).

The use of the di(meth)allyl carbonate of formula (III) has a very important practical significance when the time from the preparation of the monomeric mixture to its curing to produce the cured polymeric material or the time during which the prepared monomeric mixture is circulated or stored for sale as commercial articles is long. A cured polymeric material which is homogeneous and has the desired high refractive index cannot be obtained from the monomeric mixture in which the aromatic di(meth)allyl carbonate of formula (I) separates as a precipitate. It is not easy to dissolve the precipitate by heating at the time of curing, and the heating might change the composition of the monomeric mixture.

The aromatic di(meth)allyl carbonate of formula (I) can dissolve in the aliphatic di(meth)allyl carbonate of formula (II). However, in a monomeric mixture in which the proportion of the aromatic di(meth)allyl carbonate is, for example, as large as 10 to 100 parts by weight per 10 parts by weight of the aliphatic di(meth)allyl carbonate in order to give a cured polymeric material having the desired high refractive index, the aromatic di(meth)allyl carbonate which is normally solid at room temperature shows an increasing tendency to separate as a precipitate.

The aromatic di(meth)allyl carbonate used in this invention is represented by the following formula (I).

called an aromatic diallyl carbonate, and when $R^1$ is a methyl group, it is called an aromatic dimethallyl carbonate, in the present specification. The expression aromatic di(meth)allyl carbonate is used herein to denote both the aromatic diallyl carbonate and the aromatic dimethallyl carbonate.

Y in formula (I) is one of the following groups (a) to (g).

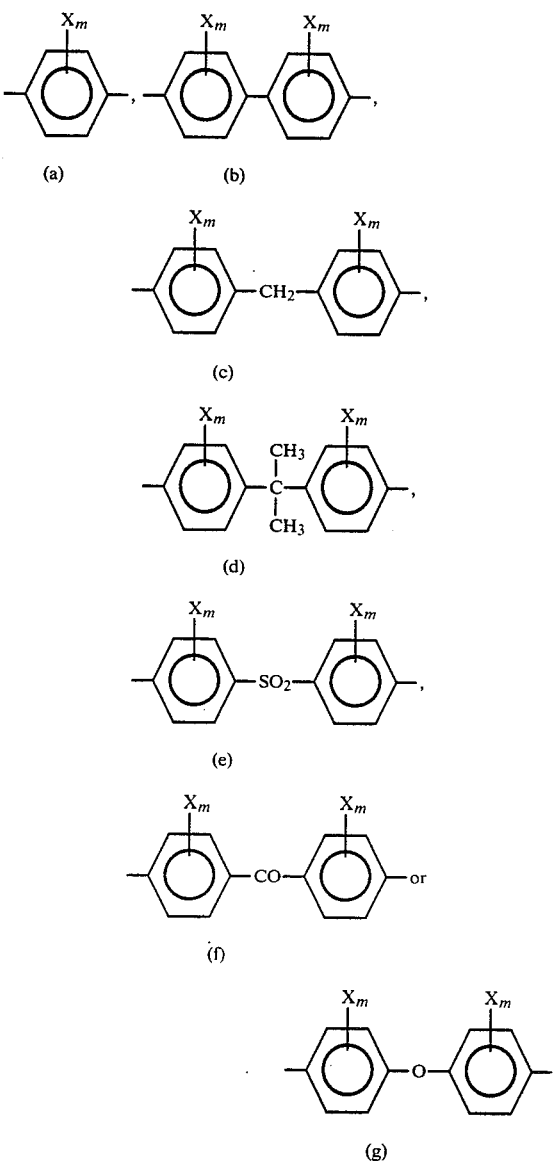

In these formulae, X's are identical or different and each represents a halogen atom such as chlorine or bromine, and m is a number of 0, 1 or 2.

That Y is the aromatic group represented by any one

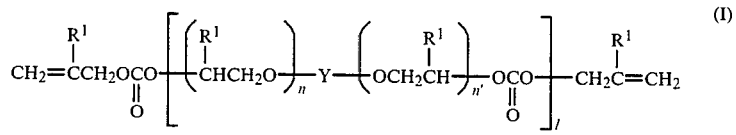

In formula (I), $R^1$'s are identical or different and each represents a hydrogen atom or a methyl group. When $R^1$ is a hydrogen atom, the compound of formula (I) is of formulae (a) to (g) serves to improve the refractive index and hardness of the cured polymeric material.

Especially when m is a number of 1 or 2 and Y is a halogen-substituted aromatic group, the refractive index of the cured polymeric material is markedly increased.

Examples of group (d) as Y are

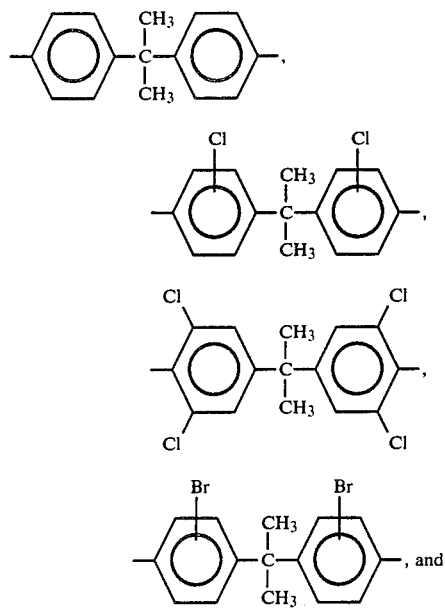

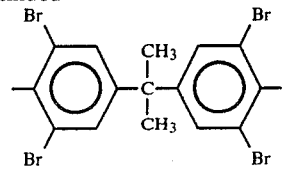

Specific examples of the other groups (a), (b), (e) and (f) will become apparent from the specific examples of the group (d) given above. Preferably, Y is the group (d), and the above two groups having bromine as substituents are especially preferred.

n and n' are identical or differentt and each represents a number of 1 to 12, preferably 1 to 4.

l is a number of 1 or 2. The compound in which l is 2 makes the viscosity of the monomeric mixture higher than does the compound in which l is 1. Hence, the performing cast polymerization, the compound in which l is 1 and the compound in which l is 2 are preferably used as a mixture in order to adjust the viscosity of the monomeric mixture to a suitable value. It is possible however to use these compounds singly.

Examples of the aromatic di(meth)allyl carbonate of formula (I) are given below. It should be understood that in the following, A represents an allyl group (—CH$_2$CH=CH$_2$) or a methallyl group

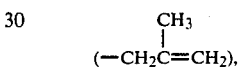

and this abbreviation is also used elsewhere in the specification.

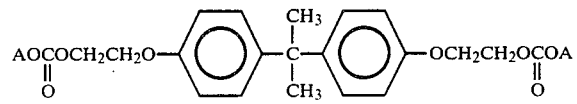

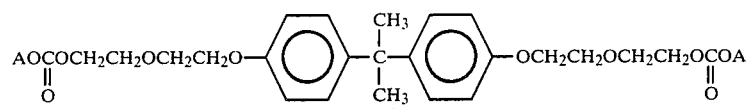

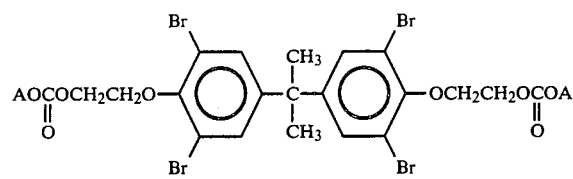

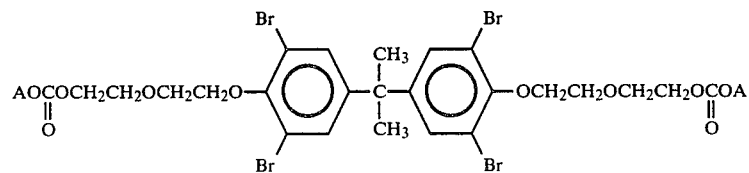

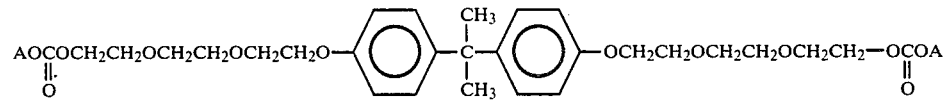

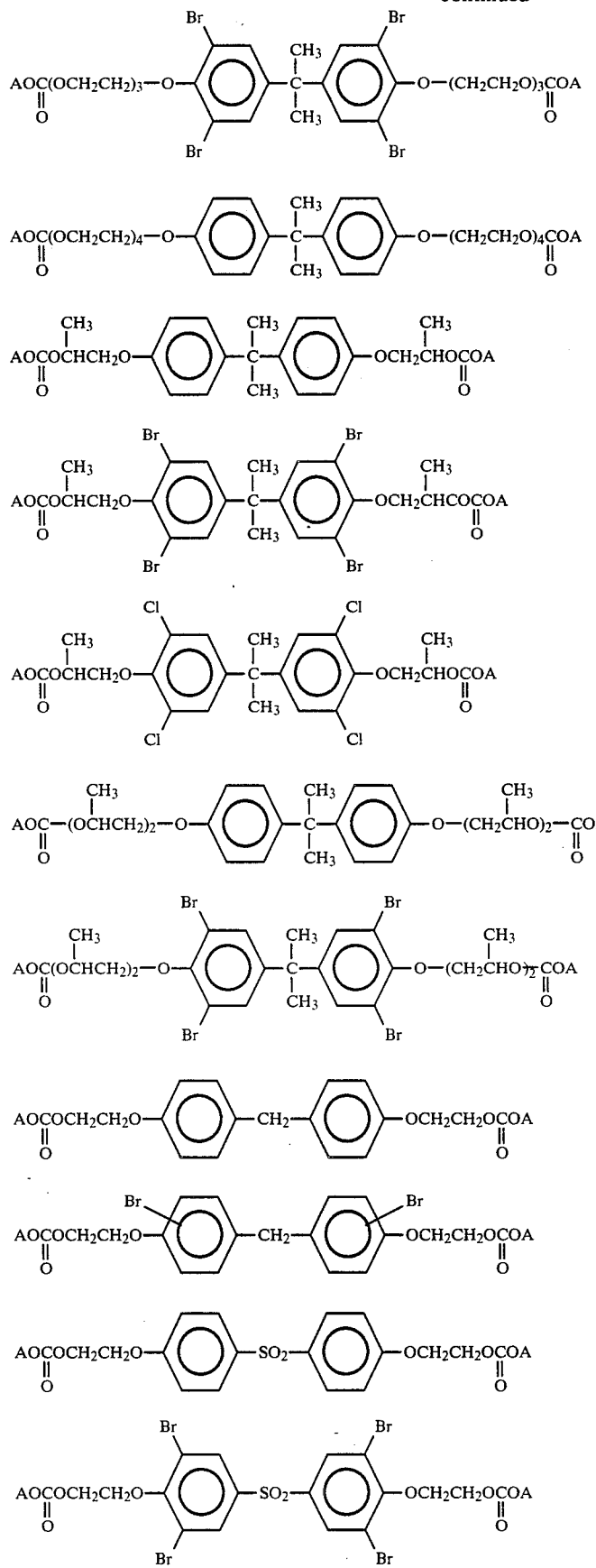

-continued
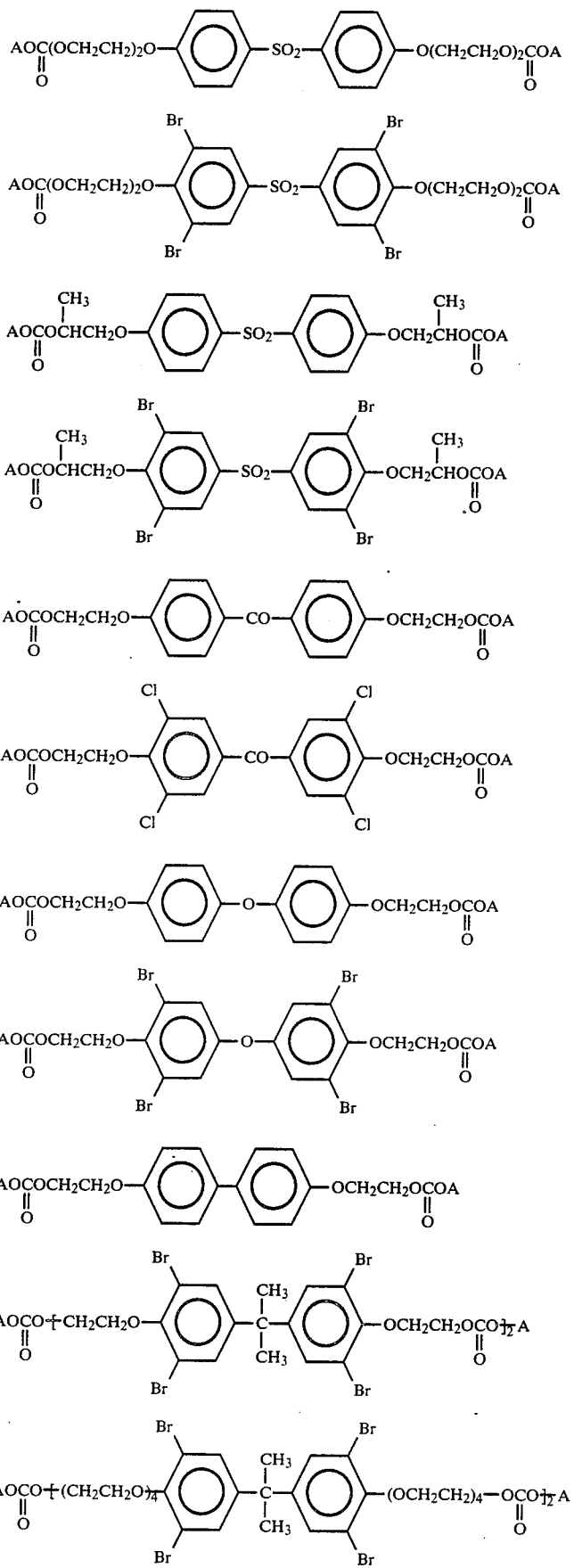

-continued

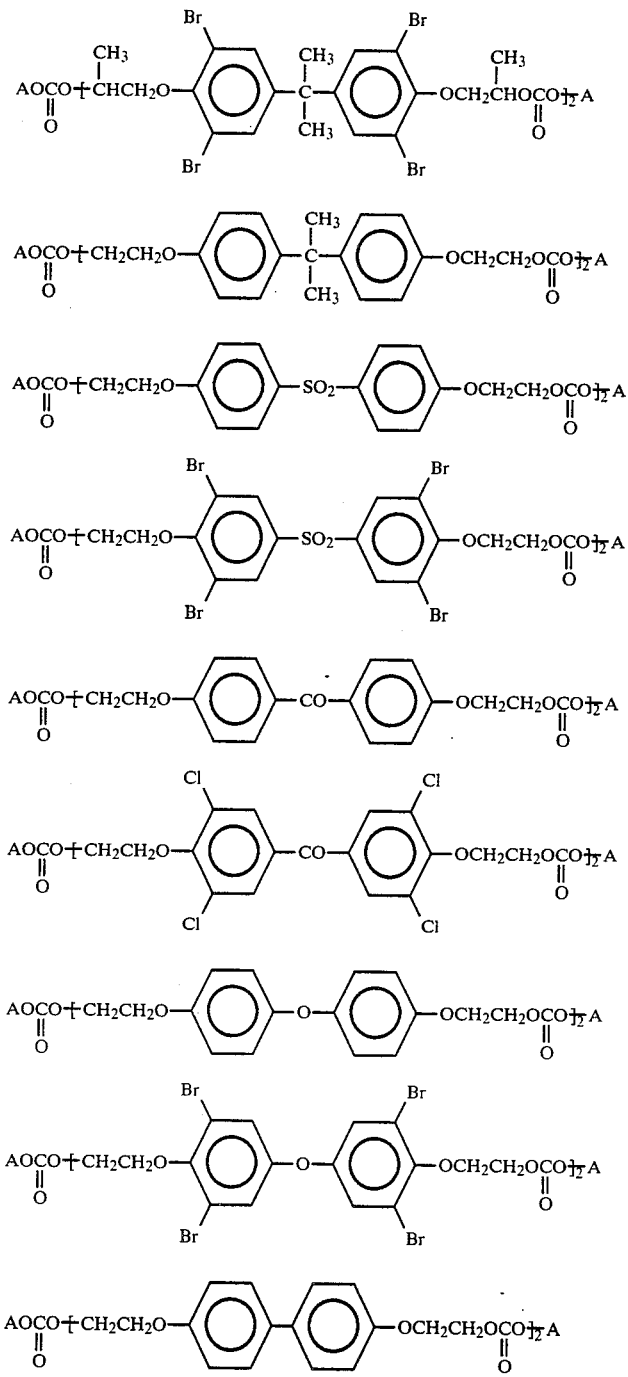

These compounds are used either singly or in combination.

The aliphatic di(meth)allyl carbonate used in this invention is represented by the following formula (II).

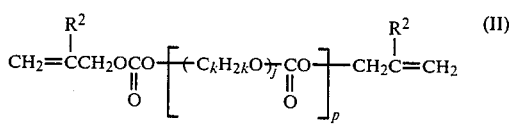

In formula (II), R²'s are identical or different and each represents a hydrogen atom or a methyl group. When R² is a hydrogen atom, the compound of formula (II) is called an aliphatic diallyl carbonate, and when R² is a methyl group, it is called an aliphatic dimethallyl carbonate, in the present specification. The expression aliphatic di(meth)allyl carbonate therefore is used herein to denote both an aliphatic diallyl carbonate and an aliphatic dimethallyl carbonate.

In formula (II), k is an integer of 2 to 6. Accordingly, the group $C_kH_{2k}O$, according to the value of k, denotes 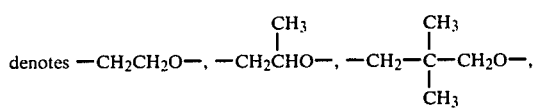

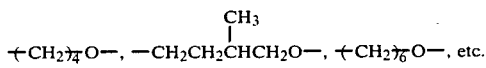

Of these, 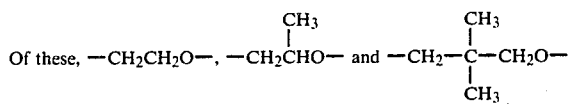 are preferred.

j is a number of 1 to 12, preferably a number of 1 to 4. p is a number of 1 or 2.

The compound in which p is 2 makes the viscosity of the monomeric mixture higher than does the compound in which p is 1. Hence, in performing cast polymerization, the compound in which p is 1 and the compound in which p is 2 are preferably used as a mixture in order to adjust the viscosity of the monomeric mixture to a suitable value. It is possible however to use these compounds singly.

Examples of the compound of formula (II) are shown below.

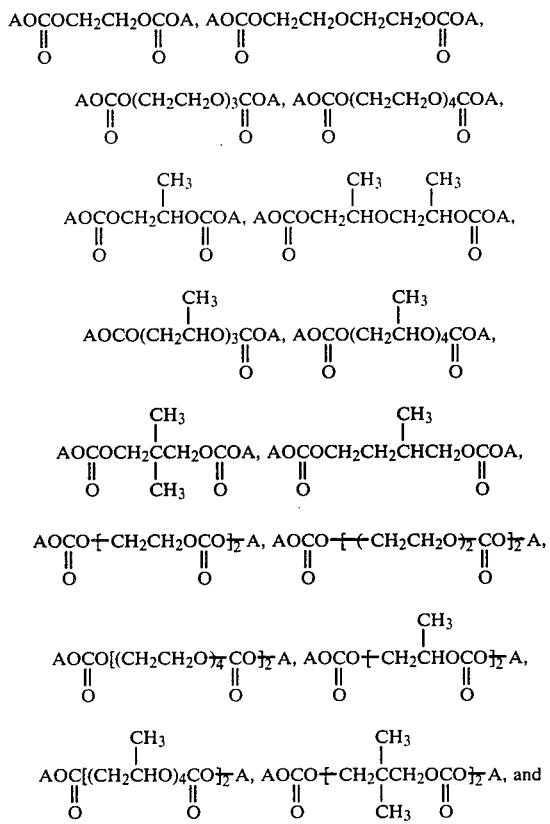

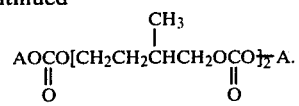

These compounds can be used either singly or in combination.

The di(methyl)allyl carbonate used in this invention together with the aromatic di(meth)allyl carbonate of formula (I) and the aliphatic di(meth)allyl carbonate of formula (II) is represented by the following formula (III).

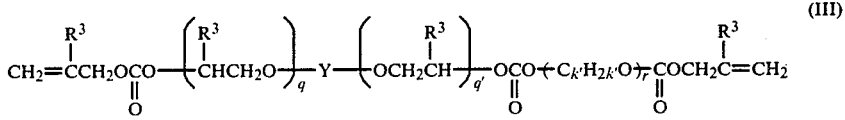

In formula (III), $R^3$'s are identical or different, and each represents a hydrogen atom or a methyl group. When $R^3$ is a hydrogen atom, the compound of formula (III) is called a diallyl carbonate, and when $R^3$ is a methyl group, it is called a dimethallyl carbonate, in the present specification. Accordingly, the expression di(meth)allyl carbonate herein denotes both a diallyl carbonate and a dimethallyl carbonate.

Y is a group selected from the groups defined with regard to formula (I). $k'$ is a number of 2 to 6. q, q' and r are a number of 1 to 12, preferably a number of 1 to 4. Specific examples of $C_{k'}H_{2k'}O$, according to the value of $k'$, will be apparent from the above specific examples of $C_kH_{2k}O$ in formula (II) above.

The structural characteristic of the compound of formula (III) is that it contains the aromatic ring (Y) common to the aromatic di(meth)allyl carbonate of formula (I), and the aliphatic group ($C_{k'}H_{2k'}O$) common to the aliphatic di(meth)allyl carbonate of formula (II).

The monomeric mixture of this invention contains the aromatic di(meth)allyl carbonate of formula (I), the aliphatic di(meth)allyl carbonate of formula (II) and the di(meth)allyl carbonate of formula (III). It contains the di(meth)allyl carbonate of formula (III) in an amount of 0.1 to 10 parts by weight per 10 parts by weight of the aliphatic di(meth)carbonate of formula (II).

Preferably, the monomeric mixture of this invention contains the aromatic di(meth)allyl carbonate of formula (I) in an amount of 10 to 100 parts by weight per 10 parts by weight of the aliphatic di(meth)allyl carbonate of formula (II), and especially preferably, it contains the aromatic di(meth)allyl carbonate of formula (I) and the di(meth)allyl carbonate of formula (III) in an amount of 20 to 70 parts by weight and 1 to 5 parts by weight, respectively, per 10 parts by weight of the aliphatic di(meth)allyl carbonate of formula (II).

The monomeric mixture of the invention may optionally contain another monomer copolymerizable with at least one of the monomers of formulae (I), (II) and (III). The other monomer may preferably be a compound having a polymerizable double bond. Examples of the other monomer include allyl compounds such as diallyl phthalate, diallyl terephthalate, diallyl isophthalate, dimethallyl isophthalate, diallyl tartrate, diallyl epoxysuccinate, diallyl maleate and allyl cinnamate; aromatic vinyl compounds such as styrene, chlorostyrene, methylstyrene, vinylnaphthalene and isopropenylnaphthalene; acrylic and methacrylic esters such as methyl methacrylate, 2-hydroxyethyl methacrylate, phenyl methacrylate, pentabromophenyl methacrylate, ethylene glycol diacrylate, diethylene glycol dimethacrylate, ethylene glycol methacrylate, bisphenol A dimethacrylate, glycidyl methacrylate, 2,2-bis(4-methacryloxyethoxyphenyl)propane and 2,2-bis(3,5-dibromo-4-methacryloxyethoxyphenyl)propane. These monomers may be used singly or in combination.

Of these other monomers, diallyl or dimethallyl esters of phthalic acid, isophthalic acid and terephthalic acid, especially diallyl isophthalate, are preferred.

The other monomer may be included in an amount of up to the total weight of the monomers of formulae (I), (II) and (III).

An especially preferred monomeric mixture provided by this invention comprises at least an aromatic diallyl carbonate represented by the following formula (I)-a

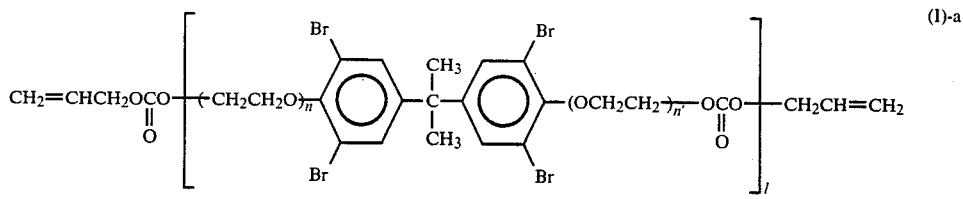

wherein n, n' and l are as defined for formula (I), an aliphatic diallyl carbonate represented by the following formula (II)-a

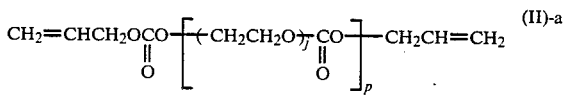

wherein j and p are as defined for formula (II), and a diallyl carbonate represented by the following formula (III)-a

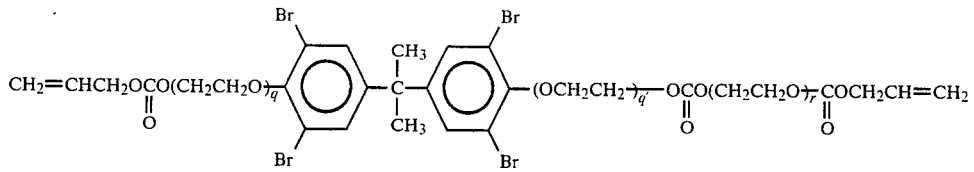

wherein q, q' and r are as defined for formula (III), the amounts of the aromatic diallyl carbonate of formula (I)-a and the diallyl carbonate of formula (III)-a being 10–100 parts by weight and 0.1–10 parts by weight per 10 parts by weight of the aliphatic diallyl carbonate of formula (II)-a.

The compounds of formulae (I) [including (I)-a], (II) [including (II)-a)] and (III) [including (III)-a] can be easily produced by an ester interchange reaction known per se. Such a method is disclosed, for example, in the specification of European Pat. No. 35304.

For example, the compound of formula (I) can be produced by heating a corresponding diol of the following formula (IV)

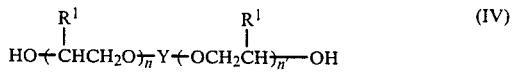

wherein $R^1$, Y, n and n' are as defined for formula (I), and a corresponding di(meth)allyl carbonate of the following formula (V)

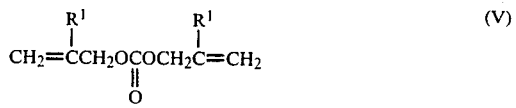

wherein $R^1$ is as defined for formula (I), in the presence of an ester interchange reaction catalyst to allow the ester interchange reaction to proceed.

The compound of formula (II) can be produced similarly by using a corresponding diol of the following formula (VI)

wherein k and j are as defined for formula (II), instead of the diol of formula (IV).

The compound of formula (III) can be produced by first forming a diol represented by the following formula (VII)

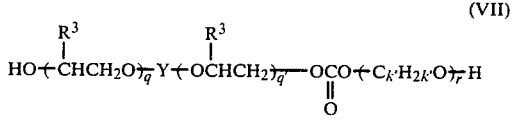

wherein $R^3$, Y, q, q', k' and r are as defined above, from a mixture of the diol of formula (IV) and the diol of formula (VI), and reacting the compound of formula (VII) with the di(meth)allyl carbonate of formula (V) under heat.

Basic compounds may be used as the ester interchange reaction catalyst. Examples include inorganic bases such as sodium hydroxide, potassium hydroxide and sodium carbonate, alkali metal alcoholates such as sodium alcoholate and potassium alcoholate, alkali metals such as sodium, and anion exchange resins such as a vinyl pyridine copolymer. Alkali hydroxides in the form of fine particles are preferred.

The reaction is carried out at a temperature of 50° to 150° C., preferably in an atmosphere of an inert gas. To induce ester interchange, the reaction is effectively carried out under reduced pressure. The reaction can thus be carried out at atmospheric pressure to 10 mmHg. The reaction can be efficiently carried out while the (meth)allyl alcohol generated by the reaction is distilled off out of the system. After the scheduled reaction is terminated, the catalyst is removed by, for example, washing with water, and as desired, the reaction mixture is contacted with activated carbon to remove coloring components. Removal of the excess di(meth)allyl carbonate by distillation can give the desired monomers used in the present invention.

By mixing these monomers in the desired proportions, the monomeric mixture of this invention can be prepared.

Investigations of the present inventors have shown that the monomeric mixture of the desired composition in this invention can also be produced by subjecting a mixture of the diol of formula (IV) and the diol of formula (VI) directly to an ester-interchange reaction with the di(meth)allyl carbonate of formula (V). For example, a monomeric mixture of the composition defined in this invention can be obtained by reacting a mixture of 100 parts by weight of the diol of formula (IV) and 1 to 40 parts by weight, especially 5 to 30 parts by weight, of the diol of formula (VI) with the di(meth)allyl carbonate of formula (V) in an amount at least 5 times, especially at least 10 times, the total amount in moles of these diols.

The monomeric mixture of this invention can be polymerized by adding a radical polymerization initiator to the monomeric mixture and heating the mixture or irradiating actinic light such as ultraviolet ray onto the mixture. Conveniently, the cured polymeric material of this invention for use as organic glass is produced by an ordinary cast polymerization method.

Examples of the radical polymerization initiator that can be used for this purpose include diacyl peroxides such as benzoyl peroxide, p-chlorobenzoyl peroxide, 2,4-dichlorobenzoyl peroxide, decanoyl peroxide, lauroyl peroxide and acetyl peroxide; percarbonates such as diisopropyl peroxydicarbonate, di-sec. butyl peroxydicarbonate and di-2-ethylhexyl peroxydicarbonate, alkyl peresters such as t-butyl peroxypivalate, and azo compounds such as azobisisobutyronitrile.

The amount of the radical polymerization initiator varies depending upon the mode of polymerization, the polymerization conditions, the types of the monomers, etc. and cannot be definitely determined. Generally, it is 0.05 to 10% by weight, preferably 0.1 to 8% by weight, based on the entire monomers.

Ultraviolet ray, alpha-ray, beta-ray, gamma-ray and X-ray may, for example, be used as the actinic light. The actinic light may be used in combination with the radical polymerization initiator.

The case polymerization method can be practiced, for example, by injecting the aforesaid monomers and the radical polymerization initiator into a mold held by an elastomer gasket or spacer, curing them in an air oven and thereafter taking out the resulting cured polymeric material. It is also possible to polymerize the monomers preliminarily in the presence of a radical polymerization initiator and thus to increase the viscosity of the monomer prior to submitting them to cast polymerization.

Among the polymerization conditions, the temperature in particular affects the properties of the resulting highly refractive resin. Since, however, the temperature condition is affected by the types of the monomers, the composition of the monomeric mixture, and the type of the polymerization initiator, it cannot be definitely determined. Generally, it is preferred to perform a so-called taper-type two-stage polymerization in which the polymerization is started at a relatively low temperature, the temperature is slowly raised, and the monomeric mixture is cured at a high temperature upon the termination of the polymerization. Since the polymerization time differs depending upon various conditions, it is preferred to determine the optimum time conforming to these conditions. Generally, it is preferred to select the conditions such that the polymerization is completed in 2 to 40 hours.

As required, various stabilizers and additives, such as mold releasing agents, ultraviolet absorbents, antioxidants, coloration inhibitors, antistatic agents and fluorescent dyes can be used prior to polymerization.

The following Examples and Comparative Examples illustrate the present invention more specifically. It should be understood however that the invention is not limited to these examples alone.

The high-refractive resins produced in these examples were tested for various properties by the following methods.

(1) Refractive index ($n_D$ for short)

The refractive index of a sample at 20° C. was measured by an Abbe's refractometer using monobromonaphthalene as a contact liquid.

(2) Hardness ($H_L$ for short)

The hardness of a test sample having a thickness of 2 mm was measured on an L-scale using a Rockwell hardness tester.

(3) Grindability

A sample was worked on a grinder to determine whether it could be ground or not. The result was evaluated by which shows that the sample could be ground, and X which shows that it could not be ground because the grinding dust stuck to the sample.

(4) Dyeability

A sample was dyed in a customary manner by using a disperse dye (PLAX Brown, a trade name for a product of Suwa Seikosha Co., Ltd.). The result was evaluated by which shows that the sample could be dyed, and X which shows that it could not be dyed.

EXAMPLES 1 TO 18

(1) Preparation of a monomeric mixture

A 5-liter three-necked flask equipped with a thermometer, a stirrer and a distillation column was charged with each of the diols having an aromatic ring, aliphatic diols and diallyl carbonate shown in Table 1 and then with powdery sodium hydroxide as a catalyst at room temperature in an atmosphere of an inert gas. They were heated to 90° C. under a pressure of 70 torr. The reaction was carried out for 2 hours while allyl alcohol formed with the progress of the reaction was distilled off. After the reaction, the reaction mixture was cooled and washed with water to remove the catalyst. Activated carbon was added to the resulting liquid reaction product, and the mixture was stirred to decolorize it. The activated carbon was separated by filtration, and by distillation, the remaining diallyl carbonate was removed to obtain a monomeric mixture of the invention.

TABLE 1

| Example No. | Diol having an aromatic ring (parts by weight) | Aliphatic diol (parts by weight) | Diallyl carbonate (parts by weight) | Catalyst (parts by weight) |
|---|---|---|---|---|
| 1 | HOCH$_2$CH$_2$O—[tetrabromobiphenyl]—OCH$_2$CH$_2$OH (435) | HO(CH$_2$CH$_2$O)$_2$H (58) | CH$_2$=CHCH$_2$OCOCH$_2$CH=CH$_2$ (O) (3160) | (8) |
| 2 | HOCH$_2$CH$_2$O—[tetrabromobiphenyl]—OCH$_2$CH$_2$OH (198) | HO(CH$_2$CH$_2$O)$_2$H (97) | CH$_2$=CHCH$_2$OCOCH$_2$CH=CH$_2$ (O) (3130) | (15) |
| 3 | HOCH$_2$CH$_2$O—[tetrabromobiphenyl]—OCH$_2$CH$_2$OH (711) | HO(CH$_2$CH$_2$O)$_4$H (53) | CH$_2$=CHCH$_2$OCOCH$_2$CH=CH$_2$ (O) (3580) | (9) |
| 4 | HOCH$_2$CH$_2$O—[tetrabromobiphenyl]—OCH$_2$CH$_2$OH (648) | HO(CH$_2$CH$_2$O)$_4$H (96) | CH$_2$=CHCH$_2$OCOCH$_2$CH=CH$_2$ (O) (3880) | (12) |
| 5 | HOCH$_2$CH$_2$O—[tetrabromobiphenyl]—OCH$_2$CH$_2$OH (316) | HOCH$_2$CH$_2$CH$_2$CH$_2$OH (35) | CH$_2$=CHCH$_2$OCOCH$_2$CH=CH$_2$ (O) (2270) | (7) |
| 6 | HOCH$_2$CH$_2$O—[tetrabromobiphenyl]—OCH$_2$CH$_2$OH (316) | HO(CH$_2$CH(CH$_3$)O)$_2$H (45) | CH$_2$=CHCH$_2$OCOCH$_2$CH=CH$_2$ (O) (2130) | (9) |
| 7 | HOCH$_2$CH$_2$O—[tetrabromobiphenyl]—OCH$_2$CH$_2$OH (316) | HO—CH$_2$C(CH$_3$)$_2$CH$_2$OH (38) | CH$_2$=CHCH$_2$OCOCH$_2$CH=CH$_2$ (O) (2220) | (7) |
| 8 | HOCH$_2$CH$_2$O—[tetrabromobiphenyl]—OCH$_2$CH$_2$OH (277) | HOCH$_2$CH$_2$OH (41) | CH$_2$=CHCH$_2$OCOCH$_2$CH=CH$_2$ (O) (2790) | (9) |
| 9 | HOCH(CH$_3$)CH$_2$O—[tetrabromobiphenyl]—OCH$_2$CH(CH$_3$)OH (319) | HO(CH$_2$CH$_2$O)$_2$H (39) | CH$_2$=CHCH$_2$OCOCH$_2$CH=CH$_2$ (O) (2170) | (9) |
| 10 | HOCH$_2$CH$_2$O—[phenyl]—OCH$_2$CH$_2$OH (163) | HO(CH$_2$CH$_2$O)$_2$H (78) | CH$_2$=CHCH$_2$OCOCH$_2$CH=CH$_2$ (O) (3960) | (19) |
| 11 | HOCH$_2$CH$_2$O—[dibromophenyl]—OCH$_2$CH$_2$OH (238) | HO(CH$_2$CH$_2$O)$_2$H (58) | CH$_2$=CHCH$_2$OCOCH$_2$CH=CH$_2$ (O) (3110) | (10) |

TABLE 1-continued

| Example No. | Diol having an aromatic ring (parts by weight) | Aliphatic diol (parts by weight) | Diallyl carbonate (parts by weight) | Catalyst (parts by weight) |
|---|---|---|---|---|
| 12 | 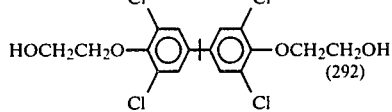 (292) | HO⁻(CH₂CH₂O)₂H (39) | CH₂=CHCH₂OCOCH₂CH=CH₂ (2580) with ‖O | (8) |
| 13 | 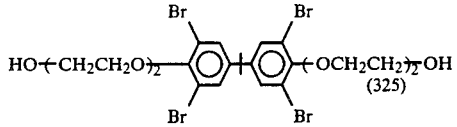 (325) | HO⁻(CH₂CH₂O)₂H (39) | CH₂=CHCH₂OCOCH₂CH=CH₂ (2080) with ‖O | (7) |
| 14 | 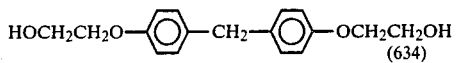 (634) | HO⁻(CH₂CH₂O)₂H (39) | CH₂=CHCH₂OCOCH₂CH=CH₂ (4480) with ‖O | (14) |
| 15 | 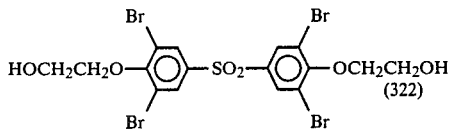 (322) | HO⁻(CH₂CH₂O)₂H (39) | CH₂=CHCH₂OCOCH₂CH=CH₂ (2120) with ‖O | (7) |
| 16 | 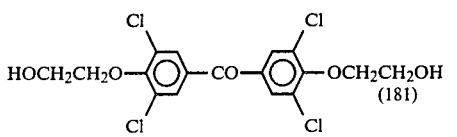 (181) | HO⁻(CH₂CH₂O)₂H (97) | CH₂=CHCH₂OCOCH₂CH=CH₂ (3380) with ‖O | (16) |
| 17 | 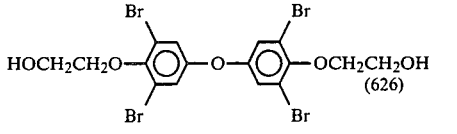 (626) | HO⁻(CH₂CH₂O)₂H (77) | CH₂=CHCH₂OCOCH₂CH=CH₂ (4510) with ‖O | (14) |
| 18 | 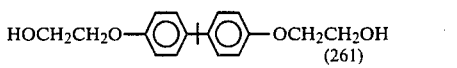 (261) | HO⁻(CH₂CH₂O)₂H (39) | CH₂=CHCH₂OCOCH₂CH=CH₂ (3050) with ‖O | (10) |

(2) The types and proportions of the constituents of the resulting monomeric mixtures were determined by liquid chromatography. The results are shown in Table 2.

In all of these Examples, the monomeric mixtures remained transparent even after they were left to stand for one week, and no precipitate was formed.

The parenthesized figures in each of the columns of Table 2 show compounds of the corresponding numbers given below.

Aromatic diallylcarbonate

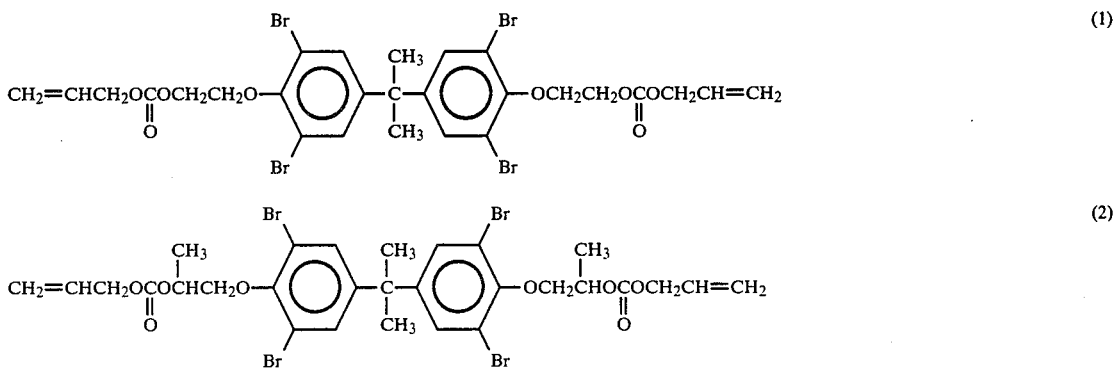

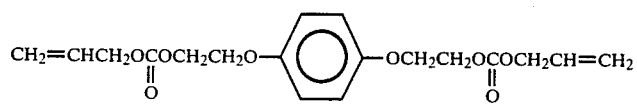
(3)
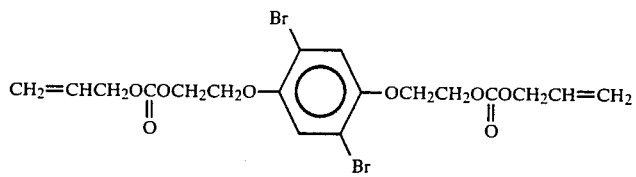
(4)
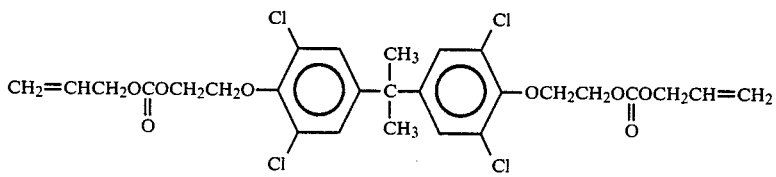
(5)
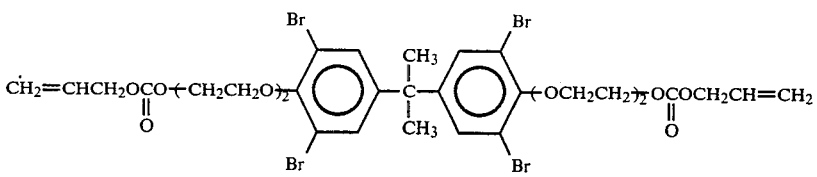
(6)
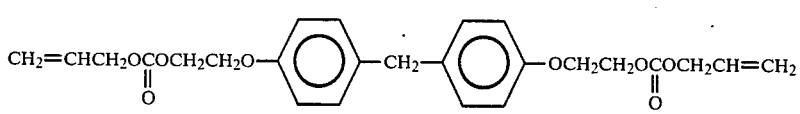
(7)
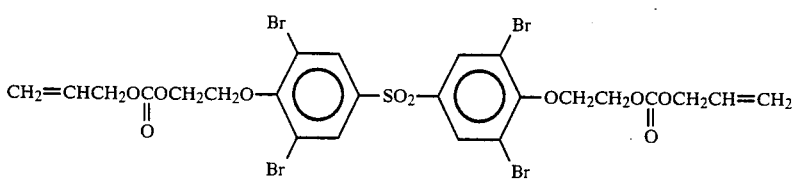
(8)
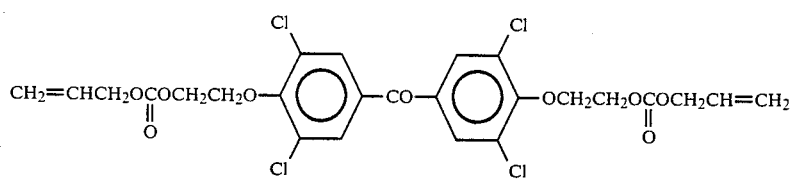
(9)
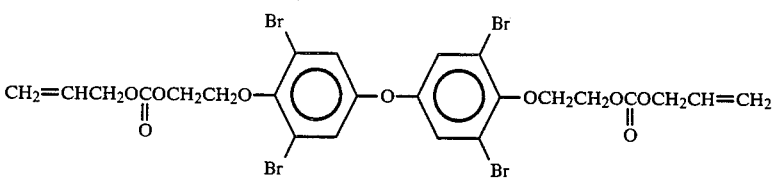
(10)
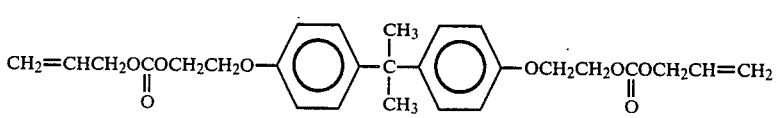
(11)
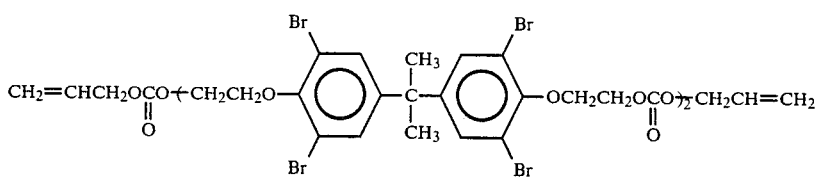
(12)

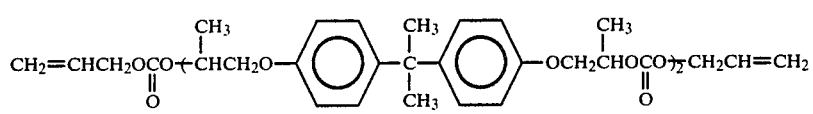 (13)
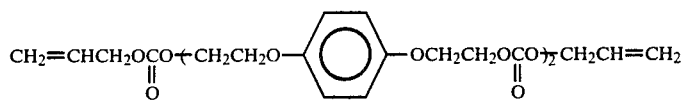 (14)
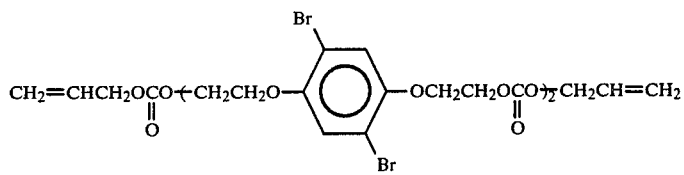 (15)
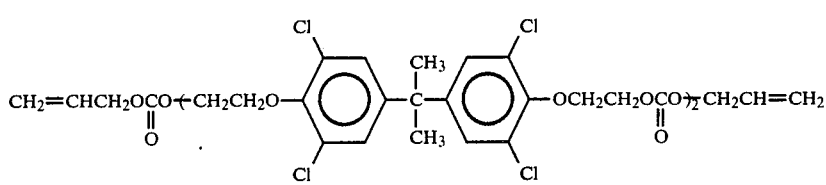 (16)
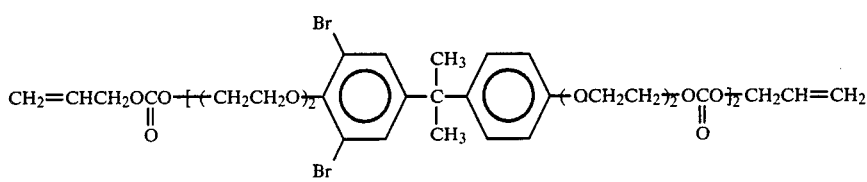 (17)
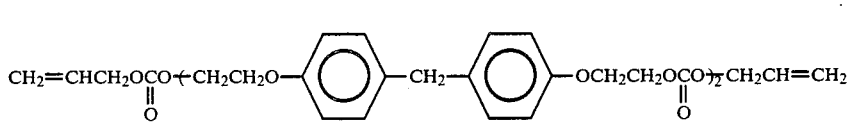 (18)
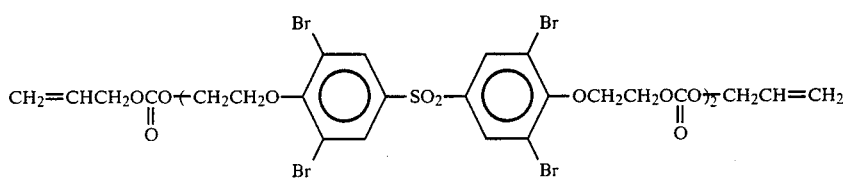 (19)
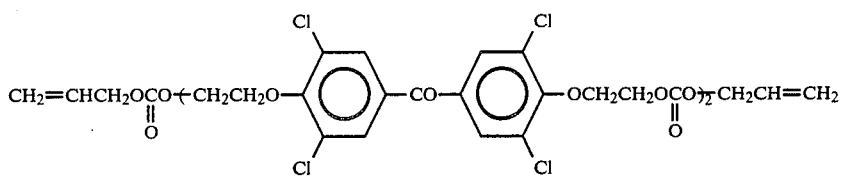 (20)
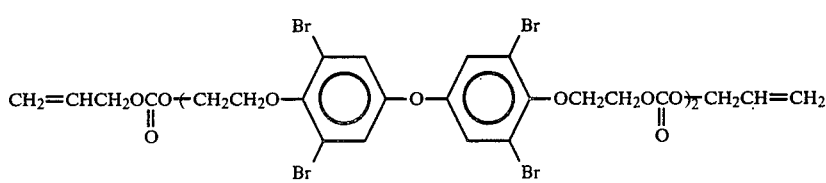 (21)
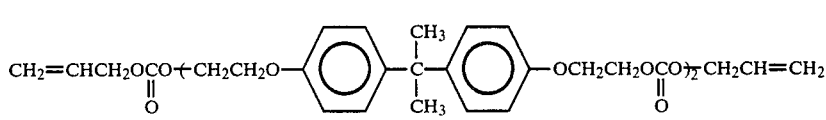 (22)
Aliphatic diallylcarbonates -continued
 (23)
 (24)
 (25)
 (26)
 (27)
 (28)
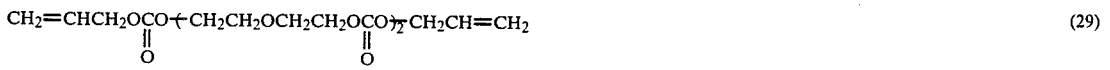 (29)
 (30)
 (31)
 (32)
 (33)
 (34)
Aromatic-aliphatic mixed carbonates
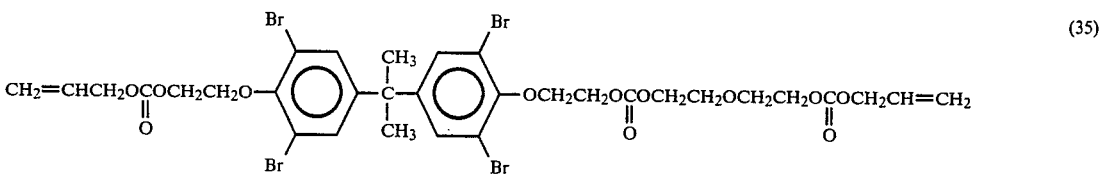 (35)
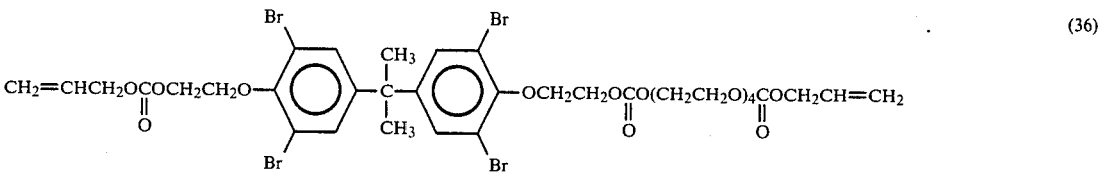 (36)

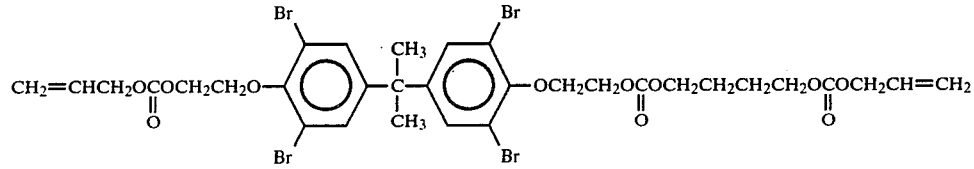
(37)
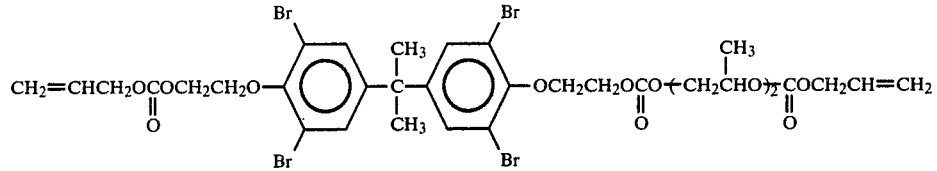
(38)
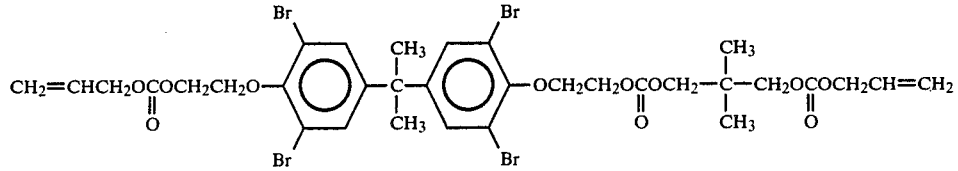
(39)
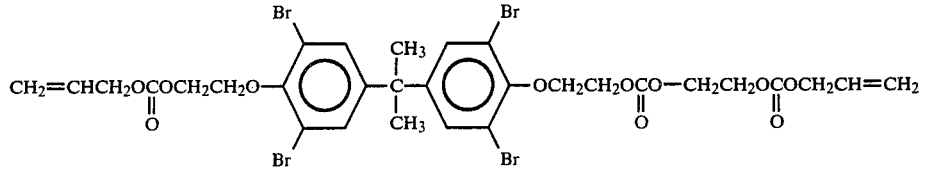
(40)
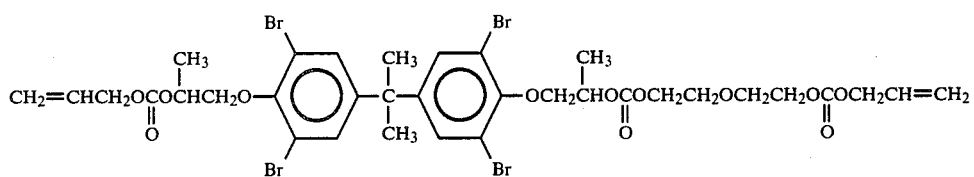
(41)
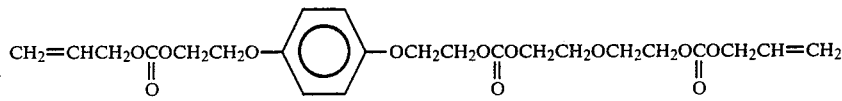
(42)
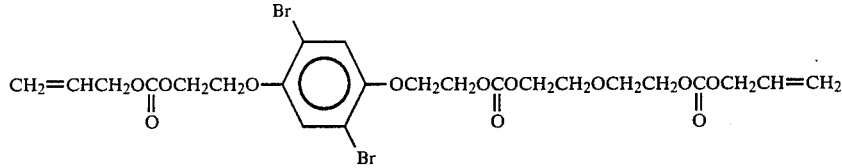
(43)
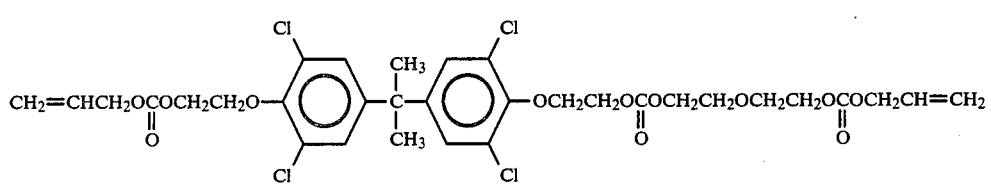
(44)
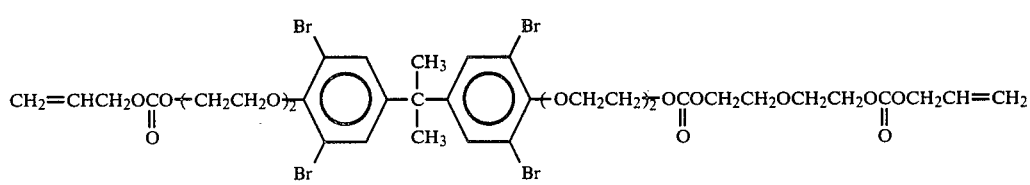
(45)
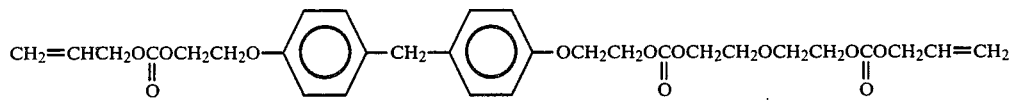
(46)

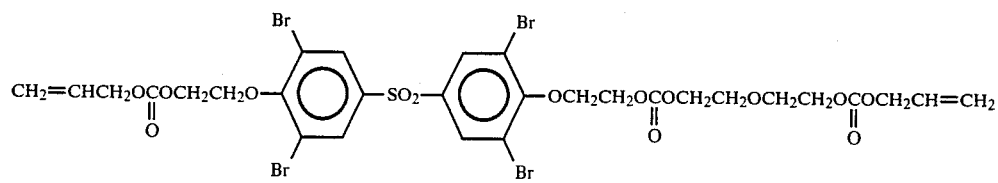
(47)

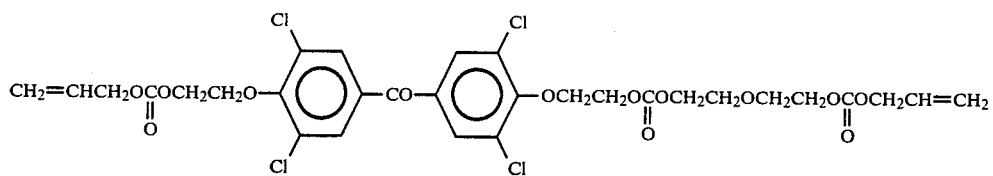
(48)

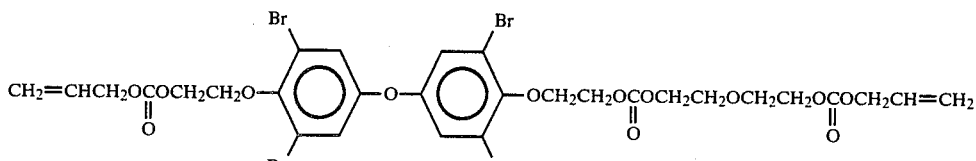
(49)

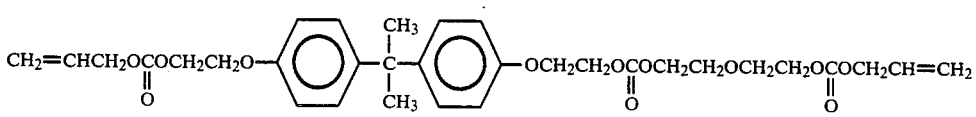
(50)

TABLE 2

| Example Nos. | Aromatic diallyl compound Dicarbonate (parts by weight) | Aromatic diallyl compound Tricarbonate (parts by weight) | Aliphatic diallyl compound Dicarbonate (parts by weight) | Aliphatic diallyl compound Tricarbonate (parts by weight) | Mixed diallyl compound (parts by weight) |
|---|---|---|---|---|---|
| 1  | (1) 65  | (12) 8  | (23) 19 | (29) 3 | (35) 4 |
| 2  | (1) 43  | (12) 4  | (23) 44 | (29) 2 | (35) 8 |
| 3  | (1) 77  | (12) 11 | (24) 9  | (30) 1 | (36) 3 |
| 4  | (1) 69  | (12) 8  | (24) 16 | (30) 2 | (36) 4 |
| 5  | (1) 68  | (12) 8  | (25) 18 | (31) 2 | (37) 4 |
| 6  | (1) 67  | (12) 9  | (26) 18 | (32) 2 | (38) 4 |
| 7  | (1) 68  | (12) 8  | (27) 19 | (33) 1 | (39) 4 |
| 8  | (1) 57  | (12) 8  | (28) 28 | (34) 2 | (40) 4 |
| 9  | (2) 67  | (13) 9  | (23) 18 | (29) 2 | (41) 5 |
| 10 | (3) 52  | (14) 5  | (23) 37 | (29) 3 | (42) 3 |
| 11 | (4) 60  | (15) 6  | (23) 27 | (29) 3 | (43) 5 |
| 12 | (5) 68  | (16) 8  | (23) 18 | (29) 2 | (44) 4 |
| 13 | (6) 68  | (17) 8  | (23) 18 | (29) 2 | (45) 4 |
| 14 | (7) 68  | (18) 6  | (23) 18 | (29) 2 | (46) 6 |
| 15 | (8) 68  | (19) 8  | (23) 18 | (29) 2 | (47) 4 |
| 16 | (9) 45  | (20) 3  | (23) 45 | (29) 2 | (48) 5 |
| 17 | (10) 68 | (21) 8  | (23) 18 | (29) 2 | (49) 4 |
| 18 | (11) 70 | (22) 7  | (23) 18 | (29) 2 | (50) 3 |

(3) Each of the monomeric mixtures shown in Table 2 was mixed fully with a predetermined amount of diisopropyl peroxydicarbonate as a radical polymerization initiator. Then, the mixture was injected into a mold composed of two glass plates having a diameter of 73 mm and a gasket of ethylene/vinyl acetate copolymer and polymerized there. The polymerization was carried out in an air oven by gradually rising the temperature from 40° C. to 90° C. in 18 hours. Thereafter, the mixture was further maintained at 90° C. for 2 hours. Then, the mold was withdrawn from the air oven, and allowed to cool after removing the gasket. After the polymer was removed from the glass plates, the mold was allowed to cool to room temperature. The appearance of the resulting transparent plate was visually observed, and its reflective index, Rockwell hardness, grindability and dyeability were measured. The results are summarized in Table 3 together with the amount of the radical polymerization initiator used.

TABLE 3

| Example | Amount of the radical initiator(*) | No. | $H_L$ | Grindability | Dyeability | Appearance |
|---|---|---|---|---|---|---|
| 1  | 1.2 | 1.582 | 112 | 0 | 0 | Colorless and transparent |
| 2  | "   | 1.550 | 105 | 0 | 0 | Colorless and transparent |
| 3  | "   | 1.586 | 113 | 0 | 0 | Colorless and transparent |
| 4  | 1.4 | 1.577 | 93  | 0 | 0 | Colorless and transparent |
| 5  | 1.2 | 1.582 | 113 | 0 | 0 | Colorless and transparent |
| 6  | "   | 1.580 | 110 | 0 | 0 | Colorless and transparent |
| 7  | "   | 1.580 | 109 | 0 | 0 | Colorless and transparent |
| 8  | "   | 1.572 | 108 | 0 | 0 | Colorless and transparent |
| 9  | 1.4 | 1.580 | 111 | 0 | 0 | Colorless and transparent |
| 10 | 4.0 | 1.522 | 96  | 0 | 0 | Colorless and transparent |
| 11 | 2.7 | 1.553 | 107 | 0 | 0 | Colorless and transparent |
| 12 | 1.2 | 1.556 | 111 | 0 | 0 | Colorless and transparent |
| 13 | 1.3 | 1.580 | 108 | 0 | 0 | Colorless and transparent |
| 14 | 1.5 | 1.537 | 94  | 0 | 0 | Colorless and transparent |
| 15 | 1.2 | 1.588 | 115 | 0 | 0 | Colorless and transparent |
| 16 | "   | 1.548 | 110 | 0 | 0 | Colorless and transparent |
| 17 | "   | 1.582 | 114 | 0 | 0 | Colorless and transparent |
| 18 | 3.7 | 1.535 | 91  | 0 | 0 | Colorless and |

TABLE 3-continued

| Example | Amount of the radical initiator(*) | No. | $H_L$ | Grindability | Dyeability | Appearance |
|---------|-----|-----|-----|-----|-----|-----|
| | | | | | | transparent |

(*)Parts by weight per 100 parts by weight of the monomeric mixture.

EXAMPLES 19 TO 21 AND COMPARATIVE EXAMPLES 1 TO 3

By synthesizing and mixing monomers, the monomeric mixtures shown in Table 4 were obtained.

The monomeric mixtures obtained in these Examples and Comparative Examples were each left to stand to examine whether phase separation occurred. With the monomeric mixtures obtained in Comparative Examples 2 and 3, crystals precipitated within 24 hours. In the product of Comparative Example 1, a precipitate began to form on the 5th day, and a clear precipitate was observed on the 6th day. In contrast, no change occurred at all after the lapse of 7 days in the monomeric mixtures obtained in Examples 19 to 21.

The crystalline precipites in Comparative Examples 1 to 3 were found to be aromatic diallyl carbonates.

In Examples 19 and 20, and Comparative Example 1, the monomeric mixtures were polymerized by the same procedure as in Examples 1 to 18, and the appearance, refractive index, Rockwell hardness and grindability of the resulting resins were measured as in Examples 1 to 18. These properties are shown in Table 5 together with the amount of diisopropyl peroxydicarbonate used. Examples 21 and Comparative Examples 2 and 3 were used for the purpose of examining the stability of the monomeric mixtures.

The parenthesized figures in Table 4 show compounds of the corresponding numbers as in Examples 1 to 18. No. 51 in Table 4, however, represents diallyl isophthalate.

TABLE 4

| | Aromatic diallyl carbonate | | Aliphatic diallyl carbonate | | | |
|---|---|---|---|---|---|---|
| | Dicarbonate (parts by weight) | Tricarbonate (parts by weight) | Dicarbonate (parts by weight) | Tricarbonate (parts by weight) | Mixed diallyl carbonate (parts by weight) | Other monomer (parts by weight) |
| Example 19 | (1) 47 | (12) 6 | (23) 14 | (29) 1 | (35) 3 | (51) 30 |
| Example 20 | (1) 49 | (12) 6 | (24) 15 | (30) 2 | (36) 3 | (51) 30 |
| Comparative Example 1 | (1) 55 | — | (23) 15 | — | — | (51) 30 |
| Example 21 | (1) 69 | (12) 8 | (23) 17 | (29) 2 | (35) 4 | — |
| Comparative Example 2 | (1) 82 | — | (23) 18 | — | — | — |
| Comparative Example 3 | (1) 69 | (12) 8 | (23) 17 | (29) 2 | — | — |

TABLE 5

| Run | Amount of the radical polymerization initiator(*) | $n_D$ | $H_L$ | Grindability | Appearance by visual observation |
|---|---|---|---|---|---|
| Example 19 | 1.3 | 1.574 | 106 | | |
| Example 20 | 1.5 | 1.573 | 110 | | |
| Comparative Example 1 | 1.3 | 1.574 | 107 | | |

(*)Same as the footnote to Table 3.

What is claimed is:

1. A cured polymeric material suitable for use as organic glass, said polymeric material obtained by polymerization of a monomeric mixture at least comprising an aromatic di(meth)allyl carbonate represented by the following formula (I)

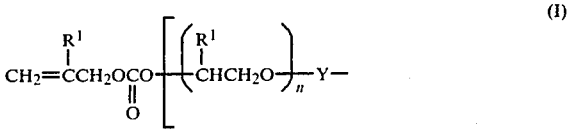

wherein $R^1$'s are identical or different and each represents a hydrogen atom or a methyl group, Y represents one of the following groups (a) to (g)

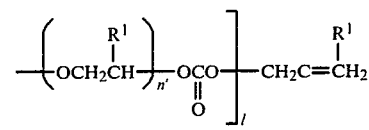

(a)   (b)

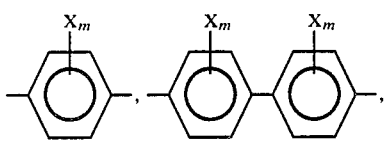

(c)

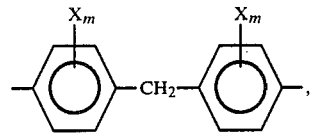

(d)

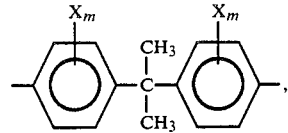

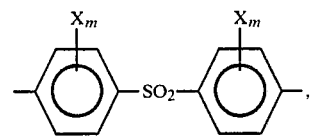

(e)

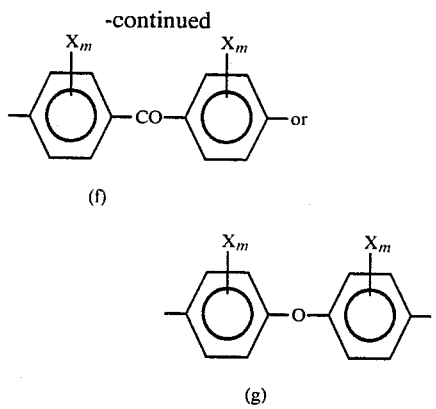

(f)

(g)

in which m is a number of 0, 1 or 2, and X's may be identical or different and each represents a bromine or chlorine atom, n and n' are identical or different and each represents a number of 1 to 12, and l is a number of 1 or 2, an aliphatic di(meth)allyl carbonate represented by the following formula (II)

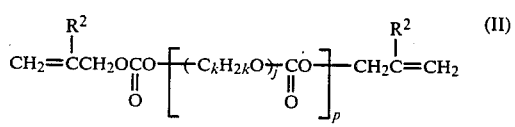

wherein $R^2$'s are identical or different and each represents a hydrogen atom or a methyl group, k is an integer of 2 to 6, j is a number of 1 to 12, and p is a number of 1 or 2, and a di(meth)allyl carbonate represented by the following formula (III)

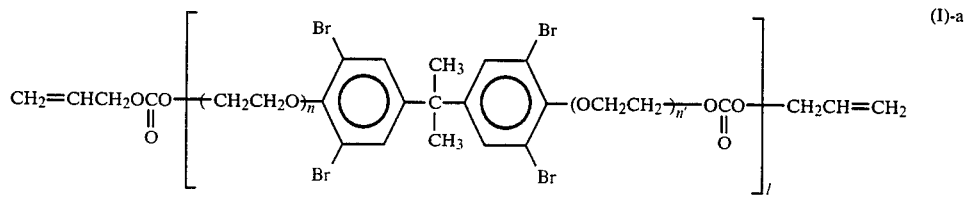

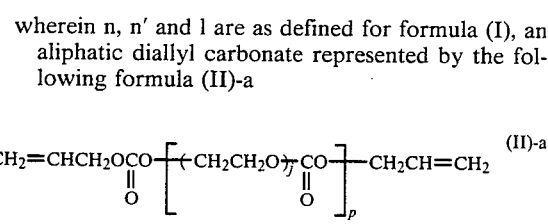

wherein $R^3$'s are identical or different and each represents a hydrogen atom or a methyl group, Y is a group selected from the groups defined for Y in formula (I), k' is a number of 2 to 6, and q, q' and r are identical or different and each represents a number of 1 to 12, the amount of the di(meth)allyl carbonate of formula (III) being 0.1 to 10 parts by weight per 10 parts by weight of the aliphatic di(meth)allyl carbonate of formala (II), and the amount of the aromatic di(meth)allyl carbonate of formula (I) is 10 to 100 parts by weight per 10 parts by weight of the aliphatic di(meth)allyl carbonate of formula (II).

2. The cured polymeric material of claim 1 wherein the proportions of the aromatic di(meth)allyl carbonate of formula (I) and the di(meth)allyl carbonate of formula (III) are 20-70 parts by weight and 1-5 parts by weight, respectively, per 10 parts by weight of the aliphatic di(meth)allyl carbonate of formula (II).

3. The cured polymeric material of claim 1 wherein the aromatic di(meth)allyl carbonate is a halogen-substituted aromatic di(meth)allyl carbonate corresponding to formula (I) in which m is 1 or 2.

4. The cured polymeric material of claim 1 which further comprises another monomer copolymerizable with at least one of the monomers of formulas (I), (II) and (III).

5. The cured polymeric material of claim 4, wherein the other monomer is a diallyl or dimethallyl ester of phthalic, isophthalic or terephthalic acid.

6. The cured polymeric material of claim 4 wherein the other monomer is diallyl isophthalate.

7. The cured polymeric material of claim 1 wherein said monomeric mixture at least comprises an aromatic diallyl carbonate represented by the following formula (I)-a

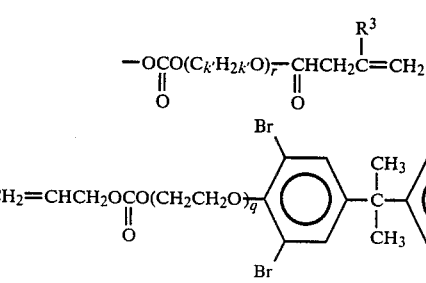

wherein n, n' and l are as defined for formula (I), an aliphatic diallyl carbonate represented by the following formula (II)-a

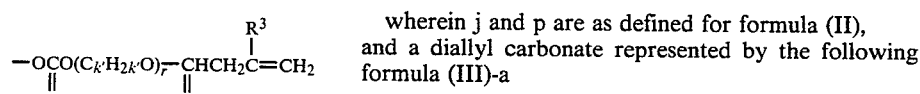

wherein j and p are as defined for formula (II), and a diallyl carbonate represented by the following formula (III)-a

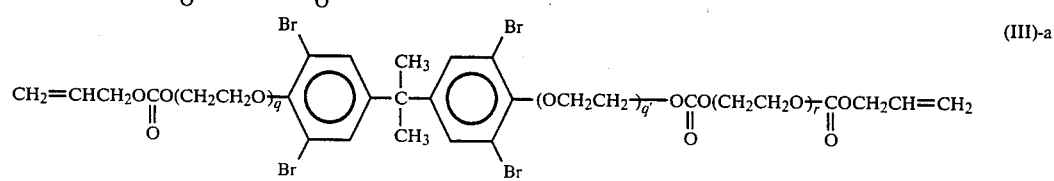

wherein q, q' and r are as defined for formula (III), the amounts of the aromatic diallyl carbonate of formula (I)-a and the diallyl carbonate of formula (III)-a being 10–100 parts by weight and 0.1–10 parts by weight, respectively, per 10 parts by weight of the aliphatic diallyl carbonate of formula (II)-a.

8. An organic glass consisting essentially of the cured polymeric material of claim 1.

9. An optical lens consisting essentially of the cured polymeric material of claim 1.

* * * * *

UNITED STATES PATENT AND TRADEMARK OFFICE
CERTIFICATE OF CORRECTION

PATENT NO. : 4,647,639

DATED : March 3, 1987

INVENTOR(S) : KIDA, ET AL.

It is certified that error appears in the above-identified patent and that said Letters Patent is hereby corrected as shown below:

Page 1, under "Foreign Application Priority Data", delete "59-211015", insert --58-211015--.

Signed and Sealed this

Eleventh Day of August, 1987

Attest:

DONALD J. QUIGG

Attesting Officer     Commissioner of Patents and Trademarks